United States Patent
Everson et al.

(10) Patent No.: US 8,619,817 B1
(45) Date of Patent: Dec. 31, 2013

(54) MESSAGE ADDRESS MANIPULATION USING SOURCE PORT CODES

(75) Inventors: John Michael Everson, Leawood, KS (US); Jason R. Delker, Olathe, KS (US); Von Karl McConnell, Leawood, KS (US); James Walter Norris, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1026 days.

(21) Appl. No.: 12/618,849

(22) Filed: Nov. 16, 2009

(51) Int. Cl.
*H04J 3/24* (2006.01)
*H04J 3/00* (2006.01)

(52) U.S. Cl.
USPC .............................. 370/474; 370/475; 370/476

(58) Field of Classification Search
USPC .................... 370/353–355, 389, 392, 393, 370/395.3–395.32, 395.54, 474–476; 709/236, 238
See application file for complete search history.

(56) References Cited

U.S. PATENT DOCUMENTS

| | | | |
|---|---|---|---|
| 6,084,877 A | 7/2000 | Egbert et al. | |
| 6,614,774 B1 | 9/2003 | Wang | |
| 7,043,247 B2 * | 5/2006 | Chitrapu | 455/445 |
| 7,107,360 B1 | 9/2006 | Phadnis et al. | |
| 7,386,881 B2 * | 6/2008 | Swander et al. | 726/14 |
| 2002/0024959 A1 * | 2/2002 | Kong | 370/401 |
| 2002/0118663 A1 * | 8/2002 | Dorenbosch et al. | 370/338 |
| 2004/0034695 A1 | 2/2004 | Touch et al. | |
| 2005/0021603 A1 * | 1/2005 | Yokomitsu et al. | 709/203 |
| 2010/0290442 A1 * | 11/2010 | Souissi et al. | 370/338 |

* cited by examiner

*Primary Examiner* — Redentor Pasia

(57) ABSTRACT

A communication gateway receives an Internet Protocol (IP) message sourced from a first IP address and directed to a second IP address. The gateway associates the first IP address with a code. The gateway processes the second IP address to identify a Radio Access Network (RAN) address. The gateway transfers the IP message directed to the RAN address and sourced from the second IP address. The IP message uses the code as the source port number. A base station receives the IP message, and in response to the RAN address, wirelessly transfers the IP message to a routing system. The routing system wirelessly receives the IP message and forwards the IP message based on the second IP address which is now in the source address field.

20 Claims, 10 Drawing Sheets

MESSAGE ADDRESS MANIPULATION USING SOURCE PORT CODES

TECHNICAL BACKGROUND

Internet Protocol (IP) messages carry information between various user systems, such as computers, cameras, and wireless modems. The IP messages have destination addresses and port numbers that direct the messages to their destinations. The IP messages also have source addresses and port numbers that are associated with the source of the IP messages.

A Radio Access Network (RAN) exchanges messages between the Internet and wireless user systems. The wireless user systems may be coupled to multiple local devices. The IP protocol used on the RAN may restrict IP addressing, so that wireless user system does not have individual IP addresses for each of the local devices.

OVERVIEW

In a communication system, a gateway system receives an Internet Protocol (IP) message sourced from a first IP address and directed to a second IP address. The gateway system associates the first IP address with a port code. The gateway system processes the second IP address to identify a Radio Access Network (RAN) address. The gateway system transfers the IP message directed to the RAN address and sourced from the second IP address—the original destination address. The IP message uses the port code as the source port number. A base station receives the IP message, and in response to the RAN address, wirelessly transfers the IP message to a routing system. The routing system wirelessly receives the IP message and forwards the IP message based on the second IP address—the original destination address—which is now in the source address field. Subsequently, the gateway system may use the port code to retrieve the first IP address—the original source address.

DETAILED DESCRIPTION

Figure 1:
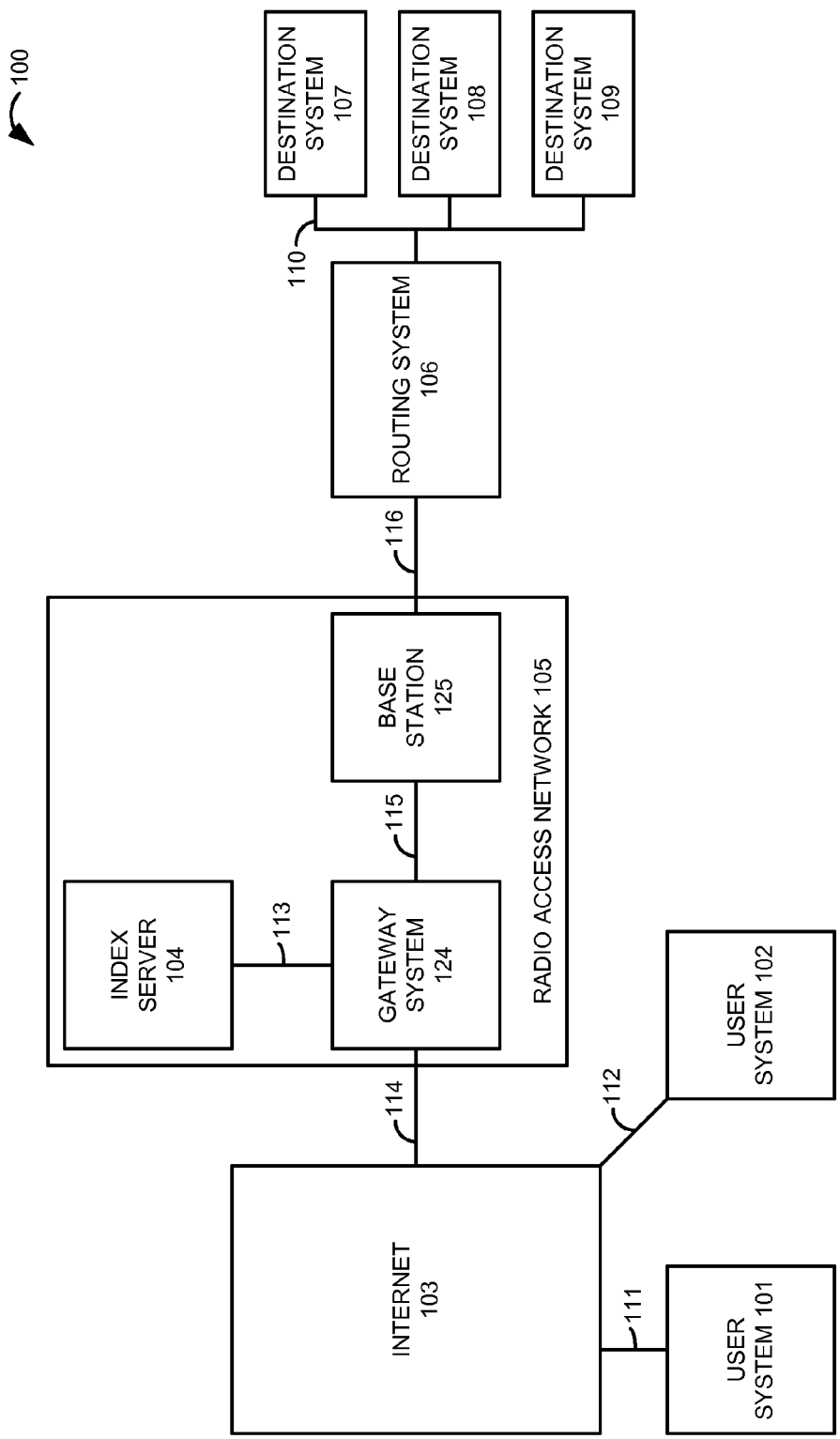
FIG. 1 illustrates a communication system that manipulates message addressing by using source port codes.
Figure 2:
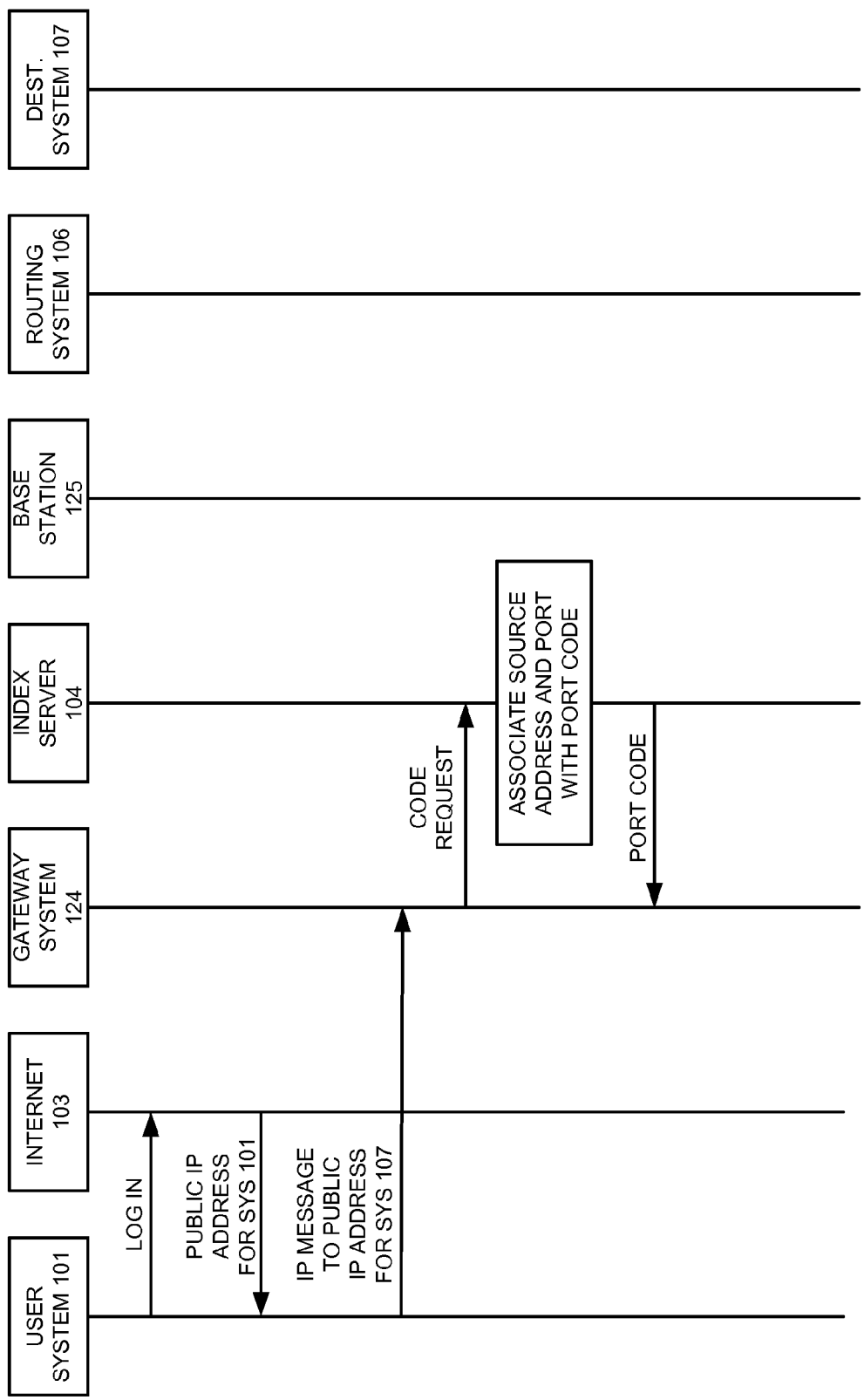
FIG. 2 illustrates the operation of the communication system to manipulate message addressing by using source port codes.

FIG. 1 illustrates communication system 100. Communication system 100 comprises user systems 101-102, internet 103, Radio Access Network (RAN) 105, routing system 106, and destination systems 107-109. RAN 105 comprises index server 104, gateway system 124, and base station 125. User systems 101-102 and destination systems 107-109 are components capable of network communication, such as computers, telephones, servers, cameras, media players, internet appliances, data storage devices, and the like. Although index server 104 is shown coupled to gateway system 124, it could be coupled to internet 103, integrated within gateway system 124, or linked to communication system 100 in some other manner.

User system 101 and gateway system 124 communicate over internet 103 and communication links 111 and 114. User system 102 and gateway system 124 communicate over internet 103 and communication links 112 and 114. Index server 104 and gateway system 124 communicate over communication link 113. Gateway system 124 and base station 125 communicate over communication link 115. Base station 125 and routing system 106 wirelessly communicate over wireless communication link 116. Routing system 106 and destination systems 107-109 communicate over Local Area Network (LAN) 110.

Destination systems 107-109 have public IP addresses that could be static or dynamic. These public IP addresses allow other systems, such as user systems 101-102, to communicate over internet 103 with destination systems 107-109. Due to a protocol restriction on RAN 105 (or some other limitation), the public IP addresses for destination systems 107-109 are homed to gateway system 124. This homing causes internet 103 and RAN 105 to route IP messages directed to these public IP addresses to gateway system 124. Gateway system 124 maintains an association between the RAN address for routing system 106 and the public IP addresses of destination systems 107-109.

Index server 104 associates special codes with source address and port numbers from IP messages. The special codes are placed in the source port fields of IP messages. Since the special codes represent both the source address and the source port, the source address field in the IP messages is now available to carry other information. In the following examples, this other information is a second destination IP address, and thus, the special code allows the IP message to carry two destination addresses. For example, an IP packet could have a destination address useful over RAN 105 in the destination address field, another destination address useful over internet 103 in the source address field.

FIGS. 2-7 illustrate the operation of communication system 100 in some examples. User system 101 logs in to internet 103—typically through an internet service provider—and receives a public Internet Protocol (IP) address from a dynamically-assigned public IP address pool. User system 101 initiates a communication with destination system 107 by sending an IP message that is addressed as follows:

destination address: public IP address for destination system 107, destination port: number for destination system 107, source address: public IP address for user system 101, and source port: number for user system 101.

Based on the destination address for destination system 107, internet 103 routes the IP message to gateway system 124.

Gateway system 124 requests a special port code from index server 104 for the source address and port—the public IP address and port number for user system 101. The special port code could be random or could have some significance. Index server 104 stores the special port code in association with the public IP address and port number for user system 101. Index server 104 transfers the special port code to gateway system 124.

Figure 3:
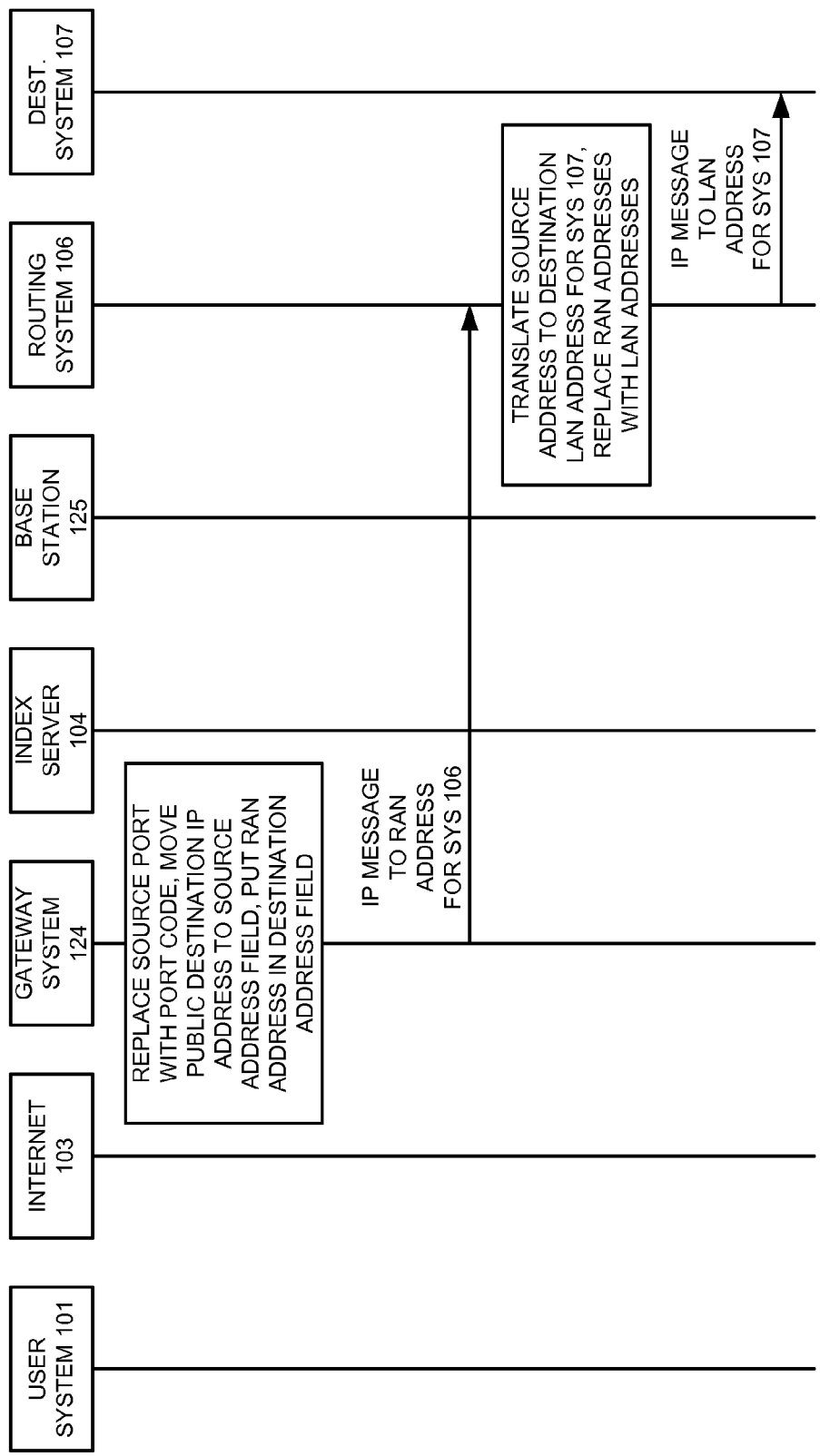
FIG. 3 illustrates the operation of the communication system to manipulate message addressing by using source port codes.

Referring to FIG. 3, gateway system 124 uses the special port code as the source port number. For transfer over RAN 105, gateway system 124 translates the destination IP address into a RAN address for routing system 106. Gateway system 124 also places the old destination IP address in the source IP address field. The IP message is now addressed as follows:

destination address: RAN address for routing system 106,
  destination port: number for destination system 107,
  source address: public IP address for destination system 107, and
  source port: special port code.

Note that the public IP address for destination system 107 is now carried in the source address field, and the original source address and port are represented by the special port code. Gateway system 124 transfers the IP message, and RAN 105 routes the IP message to routing system 106 based on the destination RAN address. Note that base station 125 wirelessly transfers this IP message to routing system 106.

Routing system 106 translates the source IP address into a LAN address and uses this LAN address as the destination address. Thus, routing system 106 translates the public IP address of destination system 107 into the LAN address of destination system 107. Routing system 106 also uses its own LAN address as the source address. The IP message is now addressed as follows:

destination address: LAN address for destination system 107,
  destination port: number for destination system 107,
  source address: LAN address for routing system 106, and
  source port: special port code.

Routing system 106 transfers the IP message over LAN 110, and LAN 110 delivers the IP message to destination system 107.

Figure 4:
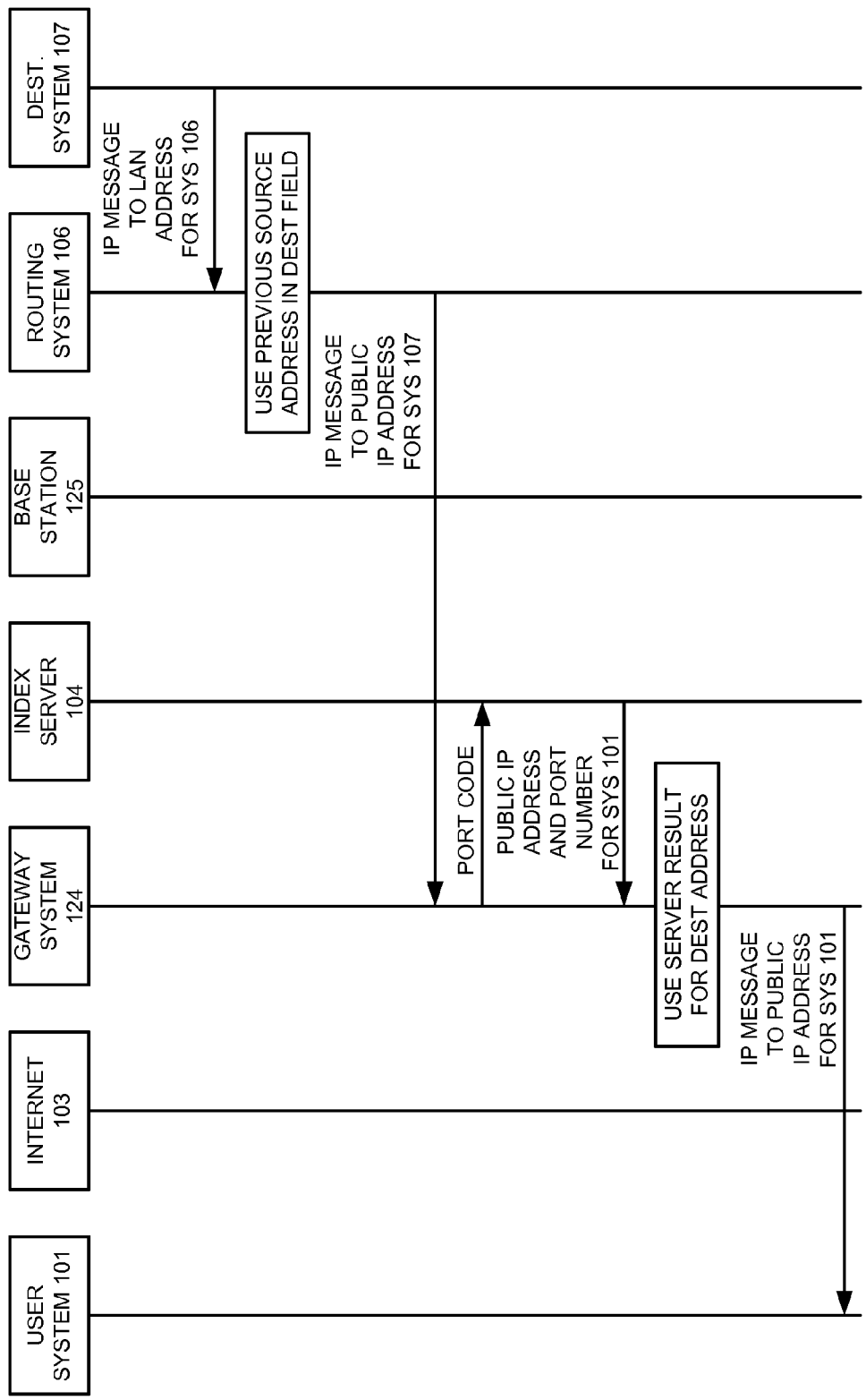
FIG. 4 illustrates the operation of the communication system to manipulate message addressing by using source port codes.

Referring to FIG. 4, destination system 107 responds to user system 101 with another IP message over LAN 110. The response IP message is addressed as follows:

destination address: LAN address for routing system 106,
  destination port: special port code,
  source address: LAN address for destination system 107, and
  source port: number for destination system 107.

LAN 110 delivers the IP message to routing system 106. For the source address, routing system 106 replaces the LAN address for destination system 107 with the public IP address for destination system 107. For the destination address and port, routing system 106 uses the public IP address for destination system 107 and the special port code (which were the source address and port in the first IP message received by routing system 106). The response IP message is now addressed as follows:

destination address: public IP address for destination system 107,
  destination port: special port code,
  source address: public IP address for destination system 107, and
  source port: number for destination system 107.

Routing system 124 wirelessly transfers the response IP message to base station 125 for delivery to gateway system 124. For the destination address and port, gateway system 124 queries index server 104 with the special port code, and index server 104 returns the associated the public IP address and port number for user system 101. The response IP message is now addressed as follows:

destination address: public IP address for user system 101,
  destination port: number for user system 101,
  source address: public IP address for destination system 107, and
  source port: number for destination system 107.

Gateway system 124 transfers the IP message to user system 101 over internet 103.

Figure 5:
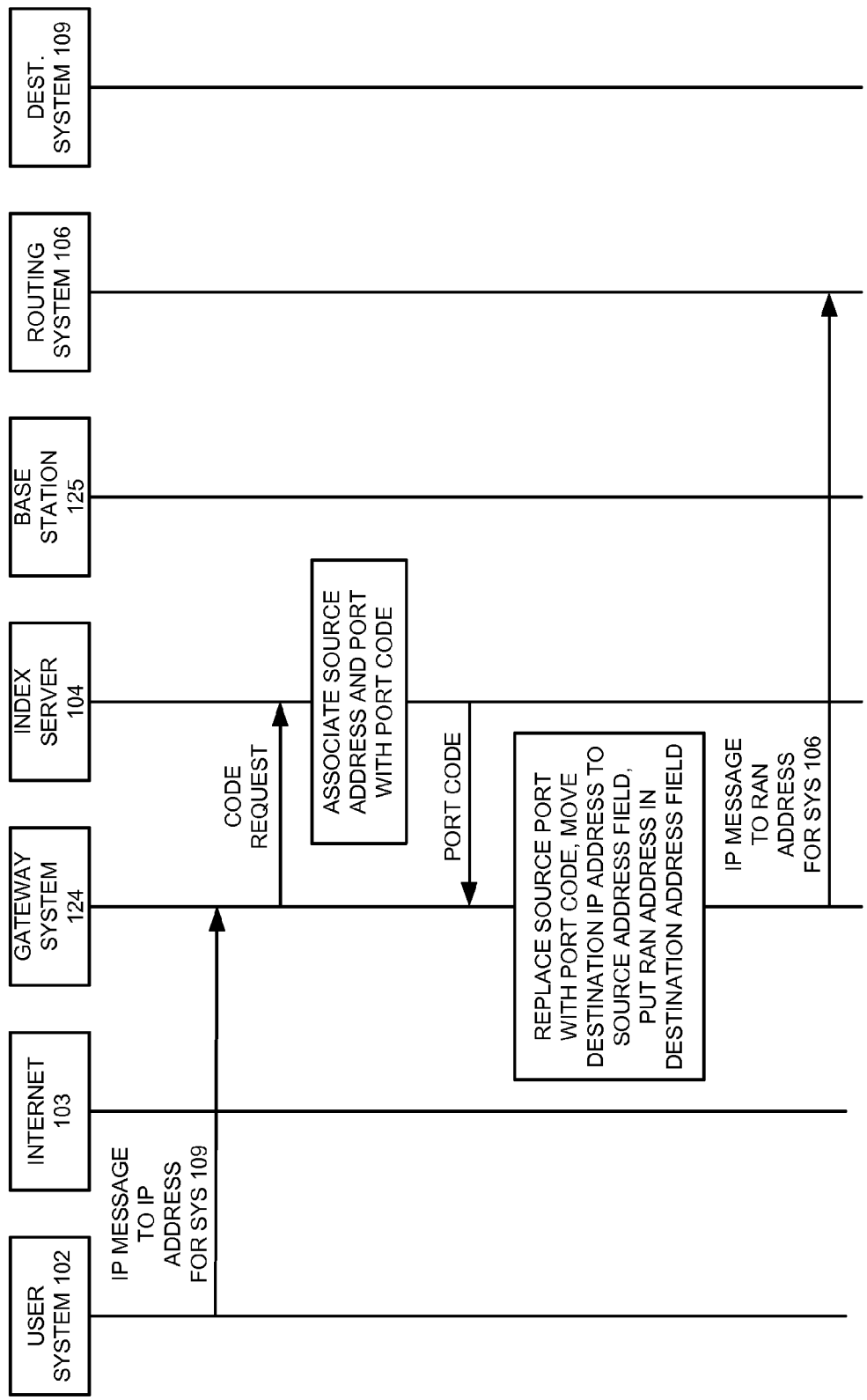
FIG. 5 illustrates the operation of the communication system to manipulate message addressing by using source port codes.

FIG. 5 begins another example. In this example, the IP addresses are static and need not be public. User system 102 initiates a communication with destination system 109 by sending an IP message that is addressed as follows:

destination address: IP address for destination system 109,
  destination port: number for destination system 109,
  source address: IP address for user system 102, and
  source port: number for user system 102.

Based on the destination address for destination system 109, internet 103 routes the IP message to gateway system 124.

Gateway system 124 requests a special port code from index server 104 for the source address and port—the IP address and port number for user system 102. Index server 104 stores the special port code in association with the IP address and port number for user system 102. Index server 104 transfers the special port code to gateway system 124.

Gateway system 124 uses the special port code as the source port number. Gateway system 124 moves the destination IP address to the source IP address field. For transfer over RAN 105, gateway system 124 translates this destination IP address into the RAN address for routing system 106 and places the RAN address in the destination address field. The IP message is now addressed as follows:

destination address: RAN address for routing system 106,
  destination port: number for destination system 109,
  source address: IP address for destination system 109, and
  source port: special port code.

Note how the previous destination address (the IP address for destination system 109) is now carried in the source address field, and the original source address and port number are represented by the special port code. Gateway system 124 transfers the IP message, and RAN 105 routes the IP message to routing system 106 based on the destination RAN address. Note that base station 125 wirelessly transfers this IP message to routing system 106.

Figure 6:
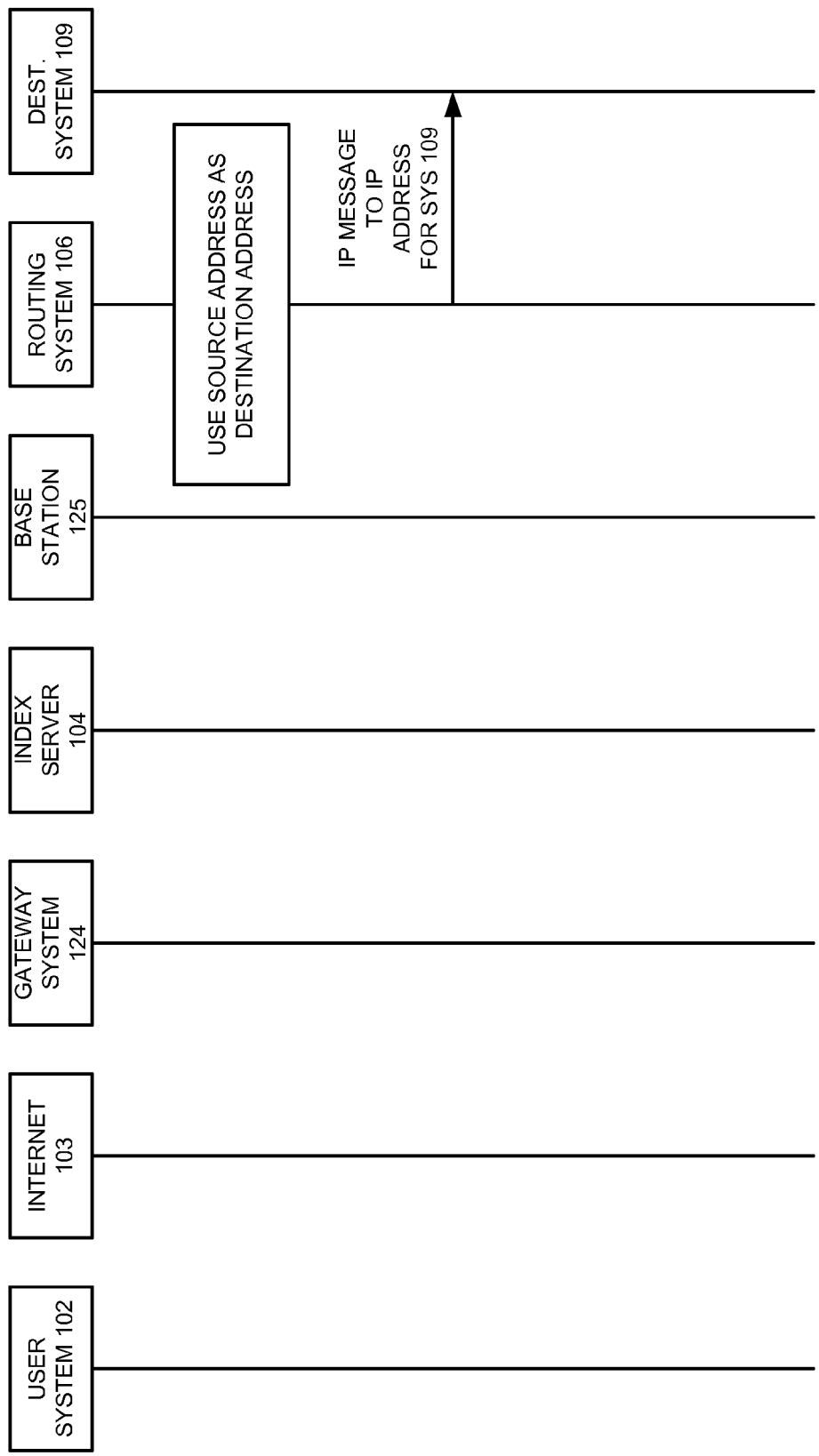
FIG. 6 illustrates the operation of the communication system to manipulate message addressing by using source port codes.

Referring to FIG. 6, routing system 106 uses the source IP address as the destination IP address and uses its own address as the source address. In this example, static IP addresses are routable over LAN 110. The IP message is now addressed as follows:

destination address: IP address for destination system 109,
  destination port: number for destination system 109,
  source address: IP address for routing system 106, and
  source port: special port code.

Routing system 106 transfers the IP message over LAN 110 to destination system 109.

Figure 7:
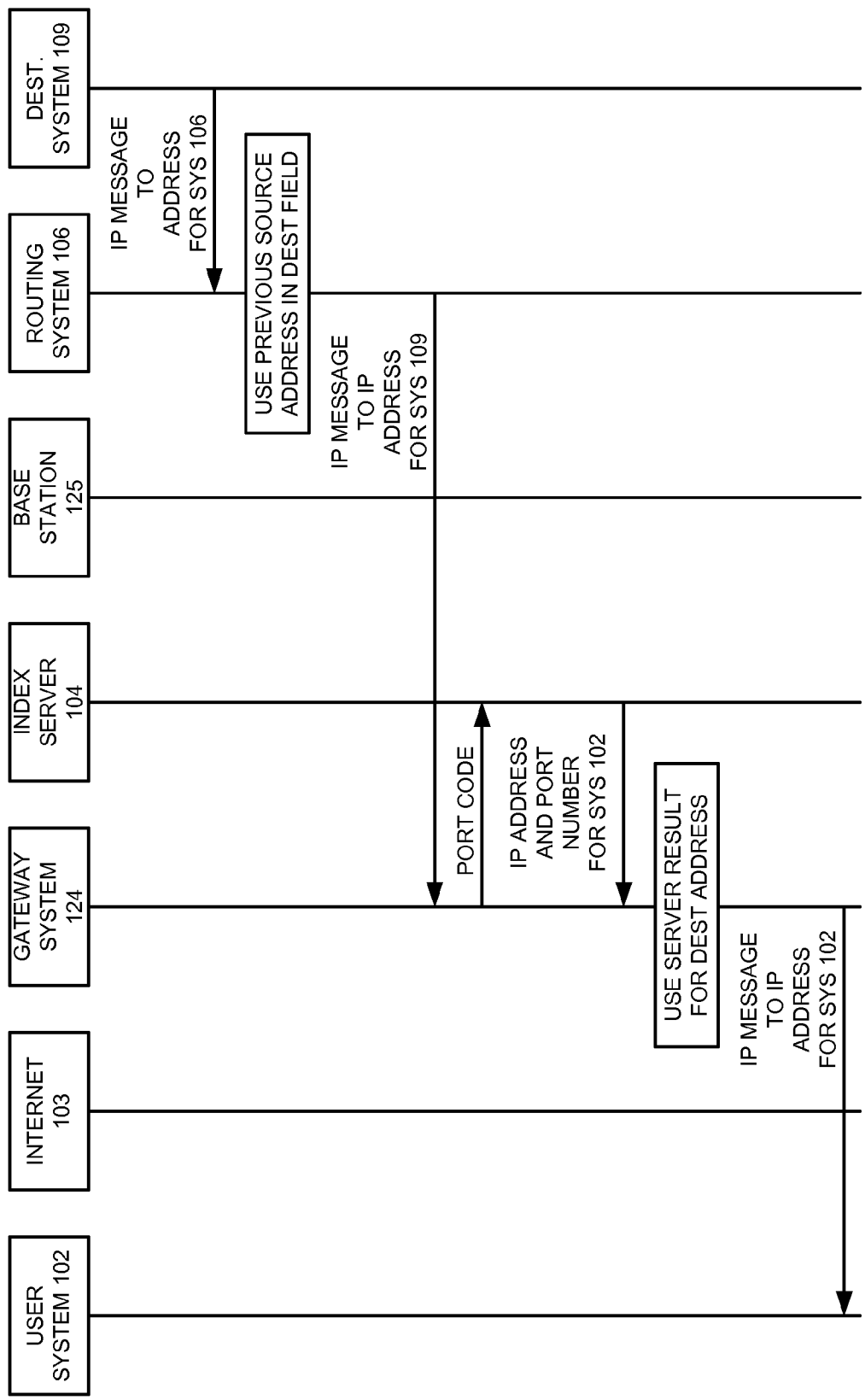
FIG. 7 illustrates the operation of the communication system to manipulate message addressing by using source port codes.

Referring to FIG. 7, destination system 109 responds to user system 102 with another IP message over LAN 110. The response IP message is addressed as follows:

destination address: IP address for routing system 106,
  destination port: special port code,
  source address: IP address for destination system 109, and
  source port: number for destination system 109.

LAN 110 delivers the IP message to routing system 106. For the destination address and port, routing system 106 uses the IP address for destination system 109 and the special port code (which were the source address and source port in the first IP message received by routing system 106 in this example). The response IP message is now addressed as follows:

destination address: public IP address for destination system 109,
destination port: special port code,
source address: public IP address for destination system 109, and
source port: number for destination system 109.

Routing system 124 wirelessly transfers the response IP message to base station 125 for delivery to gateway system 124. For the destination address and port, gateway system 124 queries index server 104 with the special port code, and index server 104 returns the associated IP address and port number for user system 102. The IP message is now addressed as follows:

destination address: IP address for user system 102,
destination port: number for user system 102,
source address: IP address for destination system 109, and
source port: number for destination system 109.

Gateway system 124 transfers the IP message to user system 102 over internet 103.

In the above described operation, note that dynamic public IP addresses can be used over internet 103 to provide user systems 101-102 with access to destination systems 107-109. Also note that RAN addresses are used over RAN 105, and LAN addresses can be used over LAN 110 (although IP addresses can also be used on LAN 110). The RAN addresses could be WIMAX addresses or LTE addresses in various implementations.

Referring back to FIG. 1, internet 103 comprises computer systems, routers, and links that transfer IP messages based on destination addresses. Index server 104 comprises a computer and communication system that associates special port codes with IP addresses and ports. Gateway system 124 comprises a computer and communication system that interfaces between IP and RAN systems. Index server 104 and gateway system 124 could be integrated together. Base station 125 comprises a RAN communication interface, processing system, and RF communication circuitry. The RF communication circuitry typically includes an antenna, amplifier, filter, RF modulator, and signal processing circuitry. Routing system 106 comprises a processing system, RF communication circuitry, and LAN communication interface. The RF communication circuitry typically includes an antenna, amplifier, filter, RF modulator, and signal processing circuitry. The LAN communication interface typically includes physical ports and signal processing circuitry. LAN 110 could be an Ethernet LAN or use some other LAN protocol. LAN 110 and communication links 111-115 use metal, glass, air, space, or some other material as the transport media. LAN 110 and communication links 111-115 could use various communication protocols, such as Time Division Multiplex (TDM), Internet Protocol (IP), Ethernet, Code Division Multiple Access (CDMA), Global System for Mobile Communication (GSM), Evolution Data Only (EVDO), Worldwide Interoperability for Microwave Access (WIMAX), Long Term Evolution (LTE), or some other communication format—including combinations thereof. LAN 110 and communication links 111-115 could be direct links or may include intermediate networks, systems, or devices. Wireless link 116 uses the air or space as the transport media. Wireless link 116 may use various protocols, such as CDMA, GSM, EVDO, WIMAX, LTE, or some other wireless communication format. Wireless link 116 could be a direct link or may include intermediate networks, systems, or devices. Note that communication system 100 has been simplified for clarity, but system 100 typically includes additional components. For example, there are typically additional user systems, base stations, routing systems, and destination systems.

Figure 8:
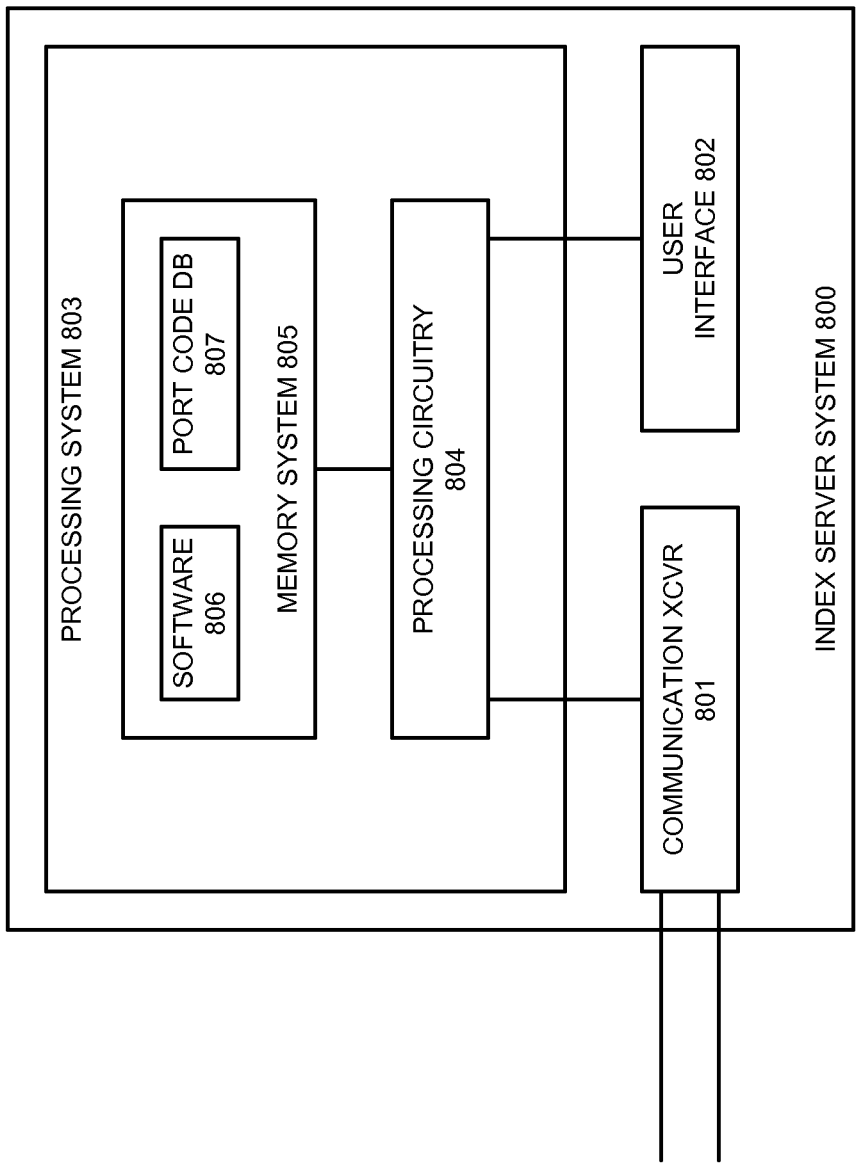
FIG. 8 illustrates an index server that associates message addressing with source port codes.

FIG. 8 illustrates index server 800 that associates message addresses and port numbers with port codes. Index server 800 is an example of index server 104, although server 104 may use alternative configurations. Index server 800 could be a discrete system, a distributed system, or could be integrated into other systems. Index server 800 comprises communication transceiver 801, user interface 802, and processing system 803. Processing system 803 comprises processing circuitry 804 and memory system 805 that stores operating software 806 and port code database 807. Processing system 803 is linked to transceiver 801 and user interface 802. Index server 800 may include other well-known components that are not shown for clarity, such as enclosures and power systems.

Communication transceiver 801 comprises a physical communication port, signal processing circuitry, software, and/or some other communication components. Communication transceiver 801 may use various protocols, such as IP, TDM, Ethernet, CDMA, GSM, EVDO, WIMAX, LTE, or some other communication format—including combinations thereof. Communication transceiver 801 is equipped to exchange IP messages (including port code requests and responses) over a communication network as described herein. Communication transceiver 801 may include wireless communication capability, although wireless communication capability is not required.

User interface 802 comprises components that interact with a user. The components may include a keyboard, display, lights, buttons, touch-screen, touch-pad, speaker, microphone, or the like.

Processing circuitry 804 comprises microprocessor and other circuitry that retrieves and executes operating software 806 from memory system 805. Memory system 805 comprises a computer-readable storage medium, such as a disk drive, flash drive, data storage circuitry, or some other memory apparatus. Memory system 805 could be a single device or be distributed across multiple devices. Processing circuitry 804 is typically mounted on one or more circuit boards that may also hold memory system 804 and portions of components 801-802.

Operating software 806 comprises computer programs, firmware, or some other form of computer-readable processing instructions. Operating software 806 may include an operating system, utilities, drivers, network interfaces, applications, or some other type of software. When executed by processing circuitry 804, operating software 804 directs processing system 803 to associate special port codes with IP addresses and port numbers as described herein. Port code database 807 stores the special port codes in association with IP addresses and port numbers as described herein.

Figure 9:
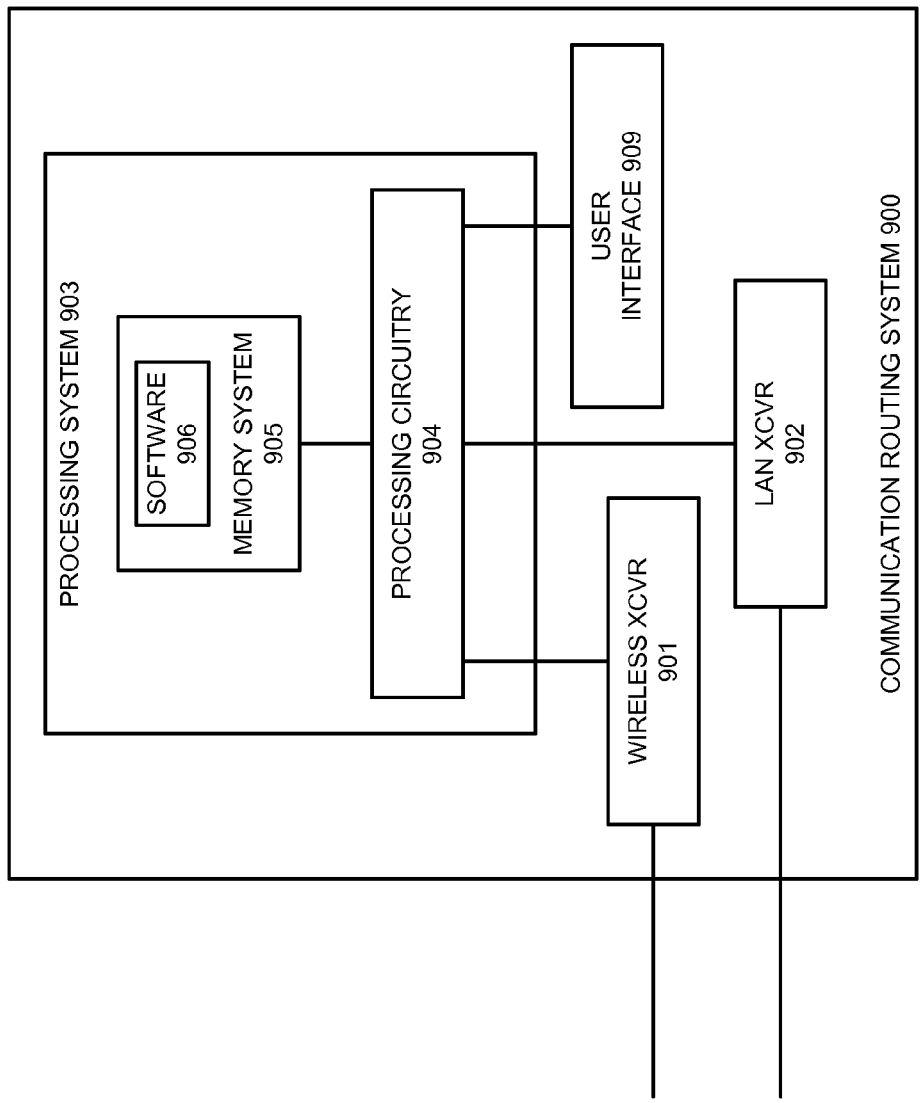
FIG. 9 illustrates a communication routing system to process message addressing that uses source port codes.

FIG. 9 illustrates communication routing system 900 to process message addressing that uses source port codes. Communication routing system 900 is an example of communication routing system 106, although system 106 may use alternative configurations. Communication routing system 900 could be a discrete system, a distributed system, or could be integrated into other systems. Communication routing system 900 comprises wireless communication transceiver 901, Local Area Network (LAN) transceiver 902, user interface 909, and processing system 903. Processing system 903 comprises processing circuitry 904 and memory system 905 that stores operating software 906. Processing system 903 is linked to transceivers 901-902 and user interface 909. Communication routing system 900 may include other well-known components that are not shown for clarity, such as enclosures and power systems.

Wireless communication transceiver 901 comprises an antenna, filter, amplifier, signal processing circuitry, software, and/or some other communication components. Communication transceiver 901 may use various wireless protocols for IP message transfers, such as CDMA, GSM, EVDO, WIMAX, LTE, or some other wireless communication format—including combinations thereof. Wireless communication transceiver 901 is equipped to exchange IP messages over a radio access network as described herein for routing system 106.

LAN communication transceiver 902 comprises a physical communication port, signal processing circuitry, software, and/or some other communication components. LAN communication transceiver 902 may use various LAN protocols, such as IP, Ethernet, or some other LAN communication format—including combinations thereof. LAN communication transceiver 902 is equipped to exchange IP messages over a LAN as described herein for routing system 106.

User interface 909 comprises components that interact with a user. The components may include a keyboard, display, lights, buttons, touch-screen, touch-pad, speaker, microphone, or the like.

Processing circuitry 904 comprises microprocessor and other circuitry that retrieves and executes operating software 906 from memory system 905. Memory system 905 comprises a computer-readable storage medium, such as a disk drive, flash drive, data storage circuitry, or some other memory apparatus. Memory system 905 could be a single device or be distributed across multiple devices. Processing circuitry 904 is typically mounted on one or more circuit boards that may also hold memory system 904 and portions of components 901-902 and 909.

Operating software 906 comprises computer programs, firmware, or some other form of computer-readable processing instructions. Operating software 906 may include an operating system, utilities, drivers, network interfaces, applications, or some other type of software. When executed by processing circuitry 904, operating software 904 directs processing system 903 to process message addressing as described herein for routing system 106.

Figure 10:
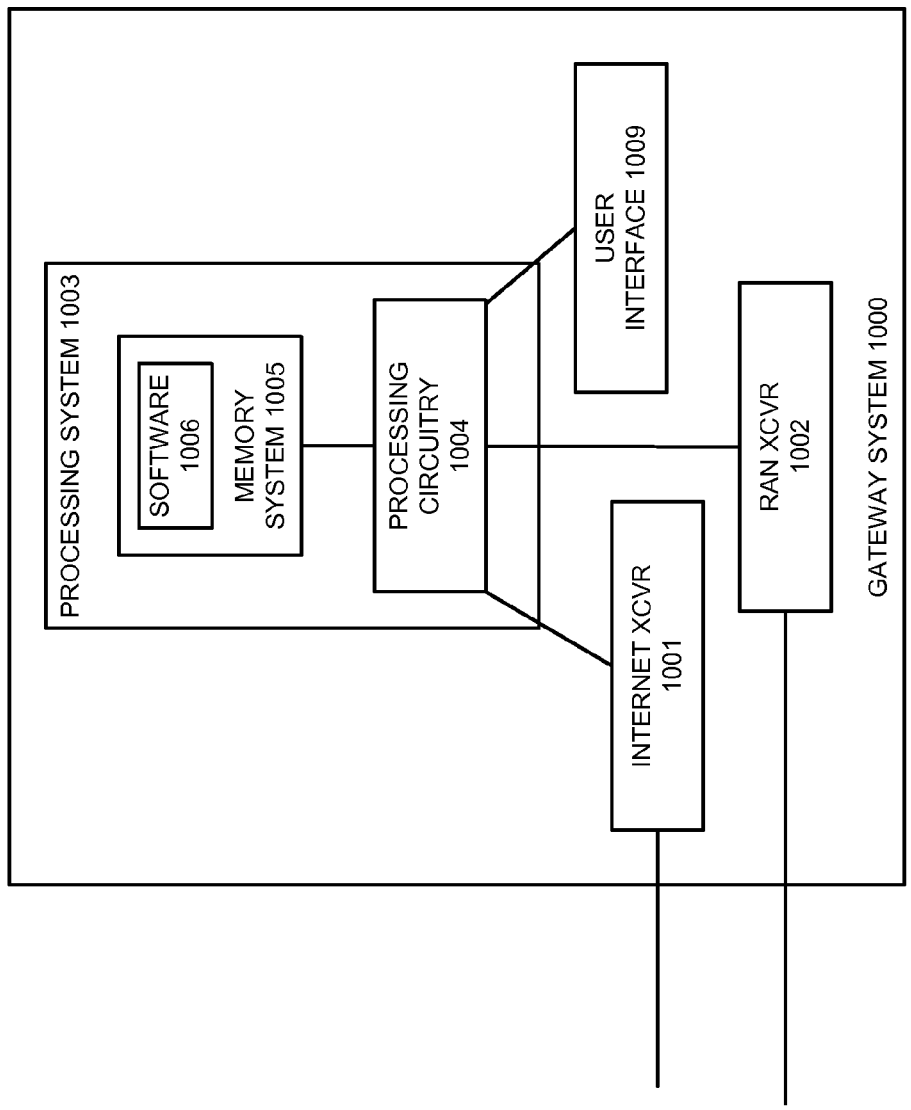
FIG. 10 illustrates a gateway system to manipulate message addressing by using source port codes.

FIG. 10 illustrates gateway system 1000 to manipulate message addressing by using source port codes. Gateway system 1000 is an example of gateway system 124, although system 124 may use alternative configurations. Gateway system 1000 could be a discrete system, a distributed system, or could be integrated into other systems. Gateway system 1000 comprises internet communication transceiver 1001, Radio Area Network (RAN) transceiver 1002 user interface 1009, and processing system 1003. Processing system 1003 comprises processing circuitry 1004 and memory system 1005 that stores operating software 1006. Processing system 1003 is linked to transceivers 1001-1002 and user interface 1009. Gateway system 1000 may include other well-known components that are not shown for clarity, such as enclosures, databases, application servers, and power systems.

Internet communication transceiver 1001 comprises physical communication ports, signal processing circuitry, software, and/or some other communication components. Internet communication transceiver 1001 may use various protocols, such as IP, TDM, Ethernet, wireless, or some other communication format—including combinations thereof. Internet communication transceiver 1001 is equipped to exchange IP messages over an IP network as described herein for gateway system 124.

RAN communication transceiver 1002 comprises a physical communication port, signal processing circuitry, software, and/or some other communication components. RAN communication transceiver 902 may use various RAN protocols, such as IP, TDM, Ethernet, wireless, or some other RAN communication format—including combinations thereof. RAN communication transceiver 902 is equipped to exchange IP messages over a RAN as described herein for gateway system 124.

User interface 1009 comprises components that interact with a user. The components may include a keyboard, display, lights, buttons, touch-screen, touch-pad, speaker, microphone, or the like.

Processing circuitry 1004 comprises microprocessor and other circuitry that retrieves and executes operating software 1006 from memory system 1005. Memory system 1005 comprises a computer-readable storage medium, such as a disk drive, flash drive, data storage circuitry, or some other memory apparatus. Memory system 1005 could be a single device or be distributed across multiple devices. Processing circuitry 1004 is typically mounted on one or more circuit boards that may also hold memory system 1004 and portions of components 1001-1002 and 1009.

Operating software 1006 comprises computer programs, firmware, or some other form of computer-readable processing instructions. Operating software 1006 may include an operating system, utilities, drivers, network interfaces, applications, or some other type of software. When executed by processing circuitry 1004, operating software 1004 directs processing system 1003 to manipulate message addressing by using source port codes as described herein for gateway system 124.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
   receiving, in a Radio Access Network (RAN) gateway system, a first Internet Protocol (IP) message sourced from a first IP address and a first port number and directed to a second IP address, encoding the first IP address and the first port number in a port code to allow a source IP address field of the first IP message to carry a different IP address than the first IP address;
   in the RAN gateway system, processing the second IP address to identify a RAN address, and transferring the first IP message as sourced from the second IP address and the port code and directed to the RAN address, wherein the first IP message now identifies at least two source IP addresses by including the second IP address and the port code that identifies at least the first IP address;
   receiving, in a RAN base station, the first IP message, and in response to the first IP message being directed to the RAN address, wirelessly transferring the first IP message to a routing system; and
   wirelessly receiving, in the routing system, the first IP message, translating the second IP address into a Local Area Network (LAN) address, and transferring the first IP message directed to the LAN address.

2. The method of claim 1 further comprising:
  receiving, in the routing system, a second IP message sourced from the LAN address, translating the LAN address into the second IP address, and wirelessly transferring the second IP message directed to the second IP address and the port code;
  receiving, in the RAN base station, the second IP message, and in response to the second IP address, transferring the second IP message to the RAN gateway system;
  receiving, in the RAN gateway system, the second IP message, translating the port code into the first IP address and the first port number, and transferring the second IP message sourced from the second IP address and the second port number and directed to the first IP address and the first port number.

3. The method of claim 2 wherein associating the first IP address and the first port number with the port code and translating the port code into the first IP address and the first port number comprises accessing an index server that stores the port code in association with the first IP address and the first port number.

4. The method of claim 1 wherein the RAN base station and the routing system wirelessly communicate using a Worldwide Interoperability for Microwave Access protocol.

5. The method of claim 1 wherein the RAN base station and the routing system wirelessly communicate using a Long Term Evolution protocol.

6. The method of claim 1 wherein the first IP address comprises a public IP address.

7. The method of claim 1 wherein the second IP address comprises a public IP address.

8. A method of operating a communication system comprising:
  receiving, in a gateway system, a first Internet Protocol (IP) message sourced from a first IP address and directed to a second IP address, encoding the first IP address in a port code to allow a source IP address field of the first IP message to carry a different IP address than the first IP address;
  processing, in the gateway system, the second IP address to identify a Radio Access Network (RAN) address, and transferring the first IP message as sourced from the second IP address and the port code and directed to the RAN address, wherein the first IP message now identifies at least two source IP addresses by including the second IP address and the port code that identifies at least the first IP address;
  receiving, in a base station, the first IP message, and in response to the first IP message being directed to the RAN address, wirelessly transferring the first IP message to a routing system; and
  wirelessly receiving, in the routing system, the first IP message.

9. The method of claim 8 further comprising, translating, in the routing system, the second IP address into a LAN address and transferring the first IP message directed to the LAN address.

10. The method of claim 8 further comprising, transferring, in the routing system, the first IP message directed to the second IP address.

11. The method of claim 8 further comprising:
  receiving, in the routing system, a second IP message and wirelessly transferring the second IP message directed to the second IP address and the port code;
  receiving, in the base station, the second IP message, and in response to the second IP address, transferring the second IP message to the gateway system;
  receiving, in the gateway system, the second IP message, translating the port code into the first IP address and the first port number, and transferring the second IP message sourced from the second IP address and the second port number and directed to the first IP address and the first port number.

12. The method of claim 11 wherein the second IP message is sourced from the LAN address and further comprising, in the routing system, translating the LAN address into the second IP address.

13. The method of claim 11 wherein associating the first IP address and the first port number with the port code and translating the port code into the first IP address and the first port number comprises accessing a server that stores the port code in association with the first IP address and the first port number.

14. The method of claim 8 wherein the base station and the routing system wirelessly communicate using a Worldwide Interoperability for Microwave Access protocol.

15. The method of claim 8 wherein the base station and the routing system wirelessly communicate using a Long Term Evolution protocol.

16. The method of claim 8 wherein the first IP address comprises a public IP address.

17. The method of claim 8 wherein the second IP address comprises a public IP address.

18. A communication system comprising:
  a Radio Access Network (RAN) gateway system configured to receive a first Internet Protocol (IP) message sourced from a first IP address and a first port number and directed to a second IP address, encode the first IP address and the first port number in a port code which allows a source address field of the first IP message to carry a different IP address than the first IP address;
  the RAN gateway system configured to, process the second IP address to identify a RAN address, and transfer the first IP message as sourced from the second IP address and the port code and directed to the RAN address, wherein the first IP message now identifies at least two source IP addresses by including the second IP address and the port code that identifies at least the first IP address;
  a RAN base station configured to receive the first IP message, and in response to the first IP message being directed to the RAN address, to wirelessly transfer the first IP message; and
  a routing system configured to wirelessly receive the first IP message.

19. The communication system of claim 18 wherein the routing system is configured to translate the second IP address into a Local Area Network (LAN) address and transfer the first IP message directed to the LAN address.

20. The method of claim 19 further wherein:
  the routing system is configured to receive a second IP message sourced from the LAN address, translate the LAN address into the second IP address, and wirelessly transfer the second IP message directed to the second IP address and the port code;
  the RAN base station is configured to receive the second IP message, and in response to the second IP address, transfer the second IP message to the RAN gateway system; and
  the RAN gateway system is configured to receive the second IP message, translate the port code into the first IP address and the first port number, and transfer the second IP message sourced from the second IP address and the second port number and directed to the first IP address and the first port number.

* * * * *